United States Patent
He et al.

(10) Patent No.: US 11,731,398 B2
(45) Date of Patent: Aug. 22, 2023

(54) EXTERIOR MATERIAL FOR POWER STORAGE DEVICE AND POWER STORAGE DEVICE

(71) Applicant: SHOWA DENKO PACKAGING CO., LTD., Kanagawa (JP)

(72) Inventors: Wei He, Kanagawa (JP); Terutoshi Kumaki, Kanagawa (JP); Makoto Karatsu, Kanagawa (JP); Takashi Nagaoka, Kanagawa (JP)

(73) Assignee: Showa Denko Packaing Co., Ltd., Isehara (JP)

( * ) Notice: Subject to any disclaimer, the term of this patent is extended or adjusted under 35 U.S.C. 154(b) by 0 days.

(21) Appl. No.: 16/312,765

(22) PCT Filed: Apr. 28, 2017

(86) PCT No.: PCT/JP2017/016880
§ 371 (c)(1),
(2) Date: Dec. 21, 2018

(87) PCT Pub. No.: WO2017/221553
PCT Pub. Date: Dec. 28, 2017

(65) Prior Publication Data
US 2019/0322076 A1 Oct. 24, 2019

(30) Foreign Application Priority Data
Jun. 24, 2016 (JP) .............................. JP2016-125294

(51) Int. Cl.
*B32B 15/08* (2006.01)
*B32B 7/12* (2006.01)
(Continued)

(52) U.S. Cl.
CPC ................ *B32B 15/08* (2013.01); *B32B 7/12* (2013.01); *H01G 11/18* (2013.01); *H01G 11/78* (2013.01);
(Continued)

(58) Field of Classification Search
CPC .......................... H01M 2/0287; H01M 50/124
See application file for complete search history.

(56) References Cited

U.S. PATENT DOCUMENTS 8,071,236 B2  12/2011  Seino
9,397,321 B2   7/2016  Kaibin et al.
(Continued)

FOREIGN PATENT DOCUMENTS

JP   2000123800 A    4/2000
JP   2008287971 A   11/2008
(Continued)

OTHER PUBLICATIONS

International Search Report for PCT/JP2017/016880 dated Jun. 6, 2017.
(Continued)

*Primary Examiner* — Nathanael T Zemui
(74) *Attorney, Agent, or Firm* — Millen, White, Zelano & Branigan, PC; Ryan Pool

(57) ABSTRACT

Provided is a packaging material for a power storage device capable of securing excellent formability without causing pinholes and/or cracks even when deep depth forming is performed and also capable of sufficiently preventing delamination even when deep depth forming is performed or even when it is used under severe environments, such as, e.g., high temperature and high humidity.
[Solving means] The packaging material for a power storage device has a configuration including a heat resistant resin layer 2 serving as an outer layer, a heat fusible resin layer 3

(Continued)

serving as an inner layer, and a metal foil layer 4 disposed between both the two layers. The heat resistant resin layer 2 is composed of a heat resistant resin film with a hot water shrinkage percentage of 1.5% to 12%. The heat resistant resin layer 2 and the metal foil layer 4 are bonded via an outer adhesive layer 5 composed of a cured film of an electron beam curable resin composition.

8 Claims, 2 Drawing Sheets

(51) Int. Cl.
*H01G 11/18* (2013.01)
*H01G 11/78* (2013.01)
*H01M 10/0525* (2010.01)
*H01M 50/124* (2021.01)
*H01M 50/129* (2021.01)
*H01M 50/119* (2021.01)
*H01M 50/121* (2021.01)
*H01M 50/103* (2021.01)
*H01M 50/145* (2021.01)
*H01M 50/133* (2021.01)

(52) U.S. Cl.
CPC ..... *H01M 10/0525* (2013.01); *H01M 50/119* (2021.01); *H01M 50/121* (2021.01); *H01M 50/124* (2021.01); *H01M 50/129* (2021.01); *B32B 2457/10* (2013.01); *B32B 2457/16* (2013.01); *H01M 50/103* (2021.01); *H01M 50/133* (2021.01); *H01M 50/145* (2021.01)

(56) References Cited

U.S. PATENT DOCUMENTS

| | | | |
|---|---|---|---|
| 10,005,937 B2 | 6/2018 | Kandori et al. | |
| 10,008,700 B2 | 6/2018 | Minamibori et al. | |
| 2008/0286635 A1 | 11/2008 | Seino | |
| 2009/0130407 A1* | 5/2009 | Hata | H01M 2/0257 428/213 |
| 2014/0335403 A1* | 11/2014 | Akita | H01M 50/116 429/176 |
| 2014/0370368 A1* | 12/2014 | Kaibin | B32B 15/20 429/163 |
| 2014/0377554 A1* | 12/2014 | Cho | C09J 123/22 428/355 EN |
| 2015/0030910 A1* | 1/2015 | Minamibori | H01M 2/0287 429/163 |
| 2015/0367601 A1* | 12/2015 | Ando | B32B 27/40 429/176 |
| 2016/0145477 A1* | 5/2016 | Kandori | H01M 2/0287 428/425.8 |
| 2016/0211490 A1* | 7/2016 | Hashimoto | B32B 27/308 |

FOREIGN PATENT DOCUMENTS

| | | |
|---|---|---|
| JP | 2013087152 A | 5/2013 |
| JP | 2014049308 A | 3/2014 |
| JP | 2015013935 A | 1/2015 |
| JP | 2015024862 A | 2/2015 |
| JP | 2015044626 A | 3/2015 |
| WO | 14208518 A1 | 12/2014 |
| WO | 2014208518 A1 | 12/2014 |

OTHER PUBLICATIONS

English Abstract for JP2015013935, Publication Date: Jan. 22, 2015.
English Abstract for JP2000123800, Publication Date: Apr. 28, 2000.
Notification of Reasons for Refusal dated Nov. 17, 2020 in corresponding Japanese patent application No. 2016-125294 (pp. 1-3) and corresponding english translation (pp. 1-3 ).
Office Action dated Jan. 25, 2021 in corresponding Korean patent application No. 20200123867 (pp. 1-5) and english translation (pp. 1-6).
1st Office Action dated Dec. 30, 2020 (dated Jan. 5, 2021) in corresponding TW patent application No. 10921272140 (pp. 1-6).

* cited by examiner

EXTERIOR MATERIAL FOR POWER STORAGE DEVICE AND POWER STORAGE DEVICE

FIELD OF THE INVENTION

The present invention relates to a packaging material for a power storage device, such as, e.g., a capacitor or a battery used for a mobile device such as a smartphone and a tablet computer, and a battery or a capacitor used to store electricity for a hybrid vehicle, an electric vehicle, a wind power generation system, a solar power generation system, and a nighttime electricity storage. It also relates to a power storage device.

In claims and this specification of the present application, the term "phosphoric acid-containing (meth) acrylate" means "phosphoric acid-containing acrylate and/or phosphoric acid-containing methacrylate".

BACKGROUND ART

A lithium ion secondary battery has been widely used as a power source for a laptop computer, a video camera, a mobile phone, an electric vehicle, and the like. As this lithium ion secondary battery, a lithium ion secondary battery having a configuration in which a battery main body (a main body including a positive electrode, a negative electrode, and an electrolyte) is surrounded by a case has been used. As a packaging material for this case, there is known a packaging material in which an outer layer made of a heat resistant resin film, an aluminum foil layer, and an inner layer made of a thermoplastic resin film are adhesively integrated in this order.

For example, there is known a laminate type packaging material provided with an inner layer made of a resin film, a first adhesive layer, a metal layer, a second adhesive layer, and an outer layer made of a resin film. In the packaging material, at least one of the first adhesive layer and the second adhesive layer is made of an adhesive composition containing a resin having an active hydrogen group in a side chain, multifunctional isocyanates, and a polyfunctional amine compound as essential components (See Patent Document 1).

A packing material for a battery case is also known in which a polyamide film or a polyester film having a thickness of 9 to 50 μm is laminated on at least one side of an aluminum foil and a film of polypropylene, maleic acid-modified polypropylene, an ethylene-acrylate copolymer or an ionomer resin having a thickness of 9 to 50 μm is laminated on the outermost side, and the tensile strength up to fracture in four directions (0°, 45°, 90°, and 135°) in the tensile test of the polyamide film or polyester film is 150 N/mm$^2$ or more and the elongation in four directions is 80% or more (see Patent Document 2).

PRIOR ART DOCUMENT

Patent Document

Patent Document 1: Japanese Unexamined Patent Application Publication No. 2008-287971
Patent Document 2: Japanese Unexamined Patent Application Publication No. 2000-123800

SUMMARY OF THE INVENTION

Problems to be Solved by the Invention

However, with the techniques described in the above-described Patent Documents 1 and 2, it was impossible to achieve both sufficient heat resistance and excellent formability required as a packaging material.

Further, in the packaging material described in Patent Document 1, delamination (peeling) is likely to occur between the metal foil layer and the outer resin layer when deep depth forming is performed, and delamination is likely to occur between the metal foil layer and the outer resin layer when the packaging material is used under severe environments, such as, e.g., high temperature and high humidity.

Further, in the packaging material described in Patent Document 2, there is a problem that when deep depth forming is performed, stress concentrates locally on the metal foil, so that pinholes and/or cracks are likely to occur.

The present invention has been made in view of the aforementioned technical background, and aims to provide a packaging material for a power storage device having heat resistance and capable of securing excellent formability without causing pinholes and/or cracks even when deep depth forming is performed and also capable of sufficiently preventing delamination (peeling) even when deep depth forming is performed or even when it is used under severe environments, such as, e.g., high temperature and high humidity. The present invention also aims to provide a packaging case for a power storage device. The present invention also aims to provide a power storage device packaged with the above-described packaging material and/or packaging case.

Means for Solving the Problems

In order to attain the aforementioned object, the present invention provides the following means.

[1] A packaging material for a power storage device comprising:
   a heat resistant resin layer serving as an outer layer;
   a heat fusible resin layer serving as an inner layer; and
   a metal foil layer disposed between both the layers,
   wherein the heat resistant resin layer is composed of a heat resistant resin film with a hot water shrinkage percentage of 1.5% to 12%, and
   wherein the heat resistant resin layer and the metal foil layer are bonded via an outer adhesive layer composed of a cured film of an electron beam curable resin composition.

[2] The packaging material for a power storage device as recited in the aforementioned Item [1],
   wherein the electron beam curable resin composition contains an acrylate resin and a photo-radical polymerization initiator.

[3] The packaging material for a power storage device as recited in the aforementioned Item [2],
   wherein the electron beam curable resin composition further contains one or more compounds selected from the group consisting of a silane coupling agent, an acid anhydride, and a phosphoric acid-containing (meth) acrylate.

[4] The packaging material for a power storage device as recited in the aforementioned Item [2] or [3],
   wherein the electron beam curable resin composition further contains one or more resins selected from the group consisting of an epoxy resin, an oxetane resin, and a vinyl ether resin.

[5] The packaging material for a power storage device as recited in the aforementioned Item [4],
   wherein the electron beam curable resin composition further contains a photo-cationic polymerization initiator.

[6] The packaging material for a power storage device as recited in the aforementioned Item [1], wherein the electron beam curable resin composition contains an acrylate resin, a photo-radical polymerization initiator, a silane coupling agent, an acid anhydride, a phosphoric acid-containing (meth) acrylate, one or more resins selected from the group consisting of an epoxy resin, an oxetane resin, and a vinyl ether resin, and a photo-cationic polymerization initiator.

[7] The packaging material for a power storage device as recited in the aforementioned Item [6],
wherein in the electron beam curable resin composition, a content rate of the acrylate resin is 50 mass % to 98 mass %, a content rate of the silane coupling agent is 0.1 mass % to 5 mass %, a content rate of the acid anhydride is 0.1 mass % to 5 mass %, a content rate of phosphoric acid-containing (meth) acrylate is 0.1 mass % to 10 mass %, a content rate of the photo-radical polymerization initiator is 0.1 mass % to 5 mass %, a content rate of one or more resins selected from the group consisting of an epoxy resin, an oxetane resin is 1 mass % to 20 mass %, and a vinyl ether resin, and a content rate of the photo-cationic polymerization initiator is 0.5 mass % to 5 mass %.

[8] The packaging material for a power storage device as recited in any one of the aforementioned Items [1] to [7], wherein a Young's modulus of the cured film is 90 MPa to 400 MPa.

[9] The packaging material for a power storage device as recited in any one of the aforementioned Items [1] to [8], wherein an easily adhesive layer is disposed between the heat resistant resin layer and the outer adhesive layer.

[10] A packaging case for a power storage device, wherein the packaging case is made of a formed product of the packaging material as recited in any one of the aforementioned Items [1] to [9].

[11] A power storage device comprising:
a power storage device main body; and
a packaging member composed of the packaging material as recited in any one of claims 1 to 9 and/or the packaging case as recited in claim 10,
wherein the power storage device main body is packaged with the packaging member.

[12] A method for producing a packaging material for a power storage device, the method comprising:
a step of preparing a first laminate in which a heat resistant resin film having a hot water shrinkage percentage of 1.5% to 12% is adhered to one surface of a metal foil layer via an electron beam curable resin composition;
a step of irradiating an electron beam against the first laminate from a heat resistant resin film side;
a step of preparing a second laminate in which a heat fusible resin film is bonded to the other surface of the metal foil layer of the first laminate after irradiating the electron beam via a thermosetting adhesive; and
a step of performing a heat treatment on the second laminate.

Effects of the Invention

In the invention as recited in the aforementioned item [1], it is configured such that the heat resistant resin layer is composed of a heat resistant resin film with a hot water shrinkage percentage of 1.5% to 12%, and the heat resistant resin layer and the metal foil layer are bonded via an outer adhesive layer composed of a cured film of an electron beam curable resin composition. Therefore, the packaging material for a power storage device has heat resistance, and can secure excellent formability without causing pinholes and/or cracks even when deep depth forming is performed by cold (normal temperature) forming, such as, e.g., deep drawing and stretch forming. Further, even when deep depth forming is performed or it is used under severe environments, such as, e.g., high temperature and high humidity, delamination (peeling) between the outer layer (heat resistant resin layer) and the metal foil layer can be sufficiently prevented. Furthermore, since the electron beam curing (such as light curing) of the electron beam curable resin composition can be performed in a shorter time compared with curing of a thermosetting resin which requires several days for heat aging, there is also an advantage that the lead time (the time required from the material input to the product completion) can be drastically shortened.

In the invention recited in the aforementioned Item [2], it is configured such that the electron beam curable resin composition includes an acrylate resin and a photo-radical polymerization initiator. Therefore, the time for the electron beam curing (light curing, etc.) can be further shortened, which in turn can further shorten the lead time.

In the invention recited in the aforementioned Item [3], since the electron beam curable resin composition further contains the above-described specific compounds, it is possible to sufficiently prevent delamination (peeling) between the outer layer and the metal foil layer.

According to the invention as recited in the aforementioned item [4], it is possible to sufficiently prevent delamination (peeling) between the outer layer and the metal foil layer.

In the invention as recited in the aforementioned item [5], it is possible to more sufficiently prevent delamination between the outer layer and the metal foil layer.

According to the invention as recited in the aforementioned item [6], it is possible to sufficiently prevent occurrence of delamination between the outer layer and the metal foil layer.

According to the invention as recited in the aforementioned item [7], it is possible to more assuredly prevent occurrence of delamination between the outer layer and the metal foil layer.

According to the invention as recited in the aforementioned item [8], since Young's modulus of the cured film is 90 MPa to 400 MPa, it is possible to sufficiently prevent delamination between the outer layer and the metal foil layer and also possible to sufficiently improve the lamination strength under high temperature environments.

In the invention recited in the aforementioned Item [9], since an easily adhesive layer is disposed between the heat resistant resin layer and the outer adhesive layer, even when it is used under severe environments, such as, e.g., high temperature and high humidity, delamination between the outer layer and the metal foil layer can be prevented more sufficiently.

In the invention recited in the aforementioned Item [10], a well formed packaging case can be provided. Further, in this packaging case, even when it is used under severe environments, such as, e.g., high temperature and high humidity, delamination between the outer layer and the metal foil layer can be prevented more sufficiently, and productivity is excellent.

In the invention recited in the aforementioned Item [11], it is possible to provide a power storage device packaged with a packaging member that can sufficiently prevent delamination even when deep depth forming is performed or it is used under severe environments, such as, e.g., high temperature and high humidity.

In the invention as recited in the aforementioned item [12], it is possible to provide a packaging material for a power storage device having heat resistance, capable of securing excellent formability without causing pinholes and/or cracks even when deep depth forming is performed and also capable of sufficiently preventing delamination between the outer layer and the metal foil layer even when it is used under severe environments, such as, e.g., high temperature and high humidity or even when deep depth forming is performed. In addition, since the curing of the outer adhesive (electron beam curable resin composition) is performed by electron beam irradiation, the production efficiency can be markedly improved.

EMBODIMENT FOR CARRYING OUT THE INVENTION

Figure 1:
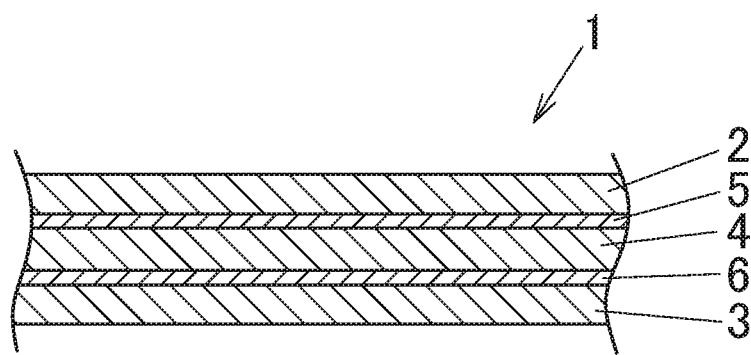
FIG. 1 is a cross-sectional view showing one embodiment of a packaging material for a power storage device according to the present invention.

One embodiment of a packaging material for a power storage device according to the present invention is shown in FIG. 1. This packaging material 1 is used as a packaging material for a battery, such as, e.g., a lithium ion secondary battery. The packaging material 1 may be used as it is as a packaging material 1 without being subjected to forming (see FIG. 4) or may be used as a shaped case 10 by being subjected to forming, such as, e.g., deep drawing and stretch forming (See FIG. 4).

The packaging materials 1 for a power storage device is configured such that a heat resistant resin layer (outer layer) 2 is integrally laminated on one surface (upper surface) of a metal foil layer 4 via an outer adhesive layer (first adhesive layer) 5 and a heat fusible resin layer (inner layer) 3 is integrally laminated on the other surface (lower surface) of the metal foil layer 4 via an inner adhesive layer (second adhesive layer) 6.

Figure 2:
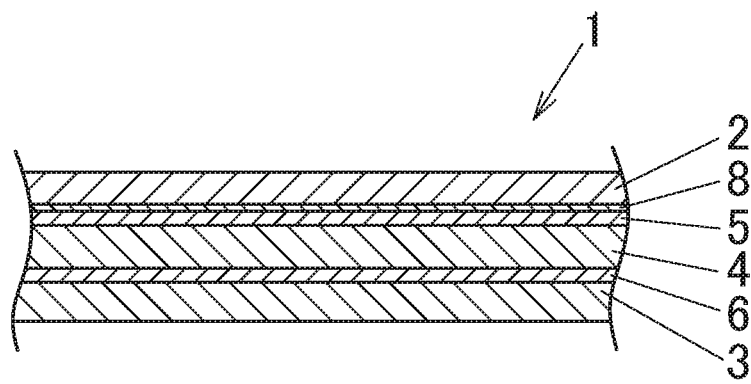
FIG. 2 is a cross-sectional view showing another embodiment of a packaging material for a power storage device according to the present invention.

Another embodiment of a packaging material for a power storage device according to the present invention is shown in FIG. 2. This packaging materials 1 for a power storage device is configured such that a heat resistant resin layer (outer layer) 2 is integrally laminated on one surface (upper surface) of a metal foil layer 4 via an outer adhesive layer (first adhesive layer) 5 and a heat fusible resin layer (inner layer) 3 is integrally laminated on the other surface (lower surface) of the metal foil layer 4 via an inner adhesive layer (second adhesive layer) 6. Further, an easily adhesive layer 8 is laminated on the lower surface of the heat resistant resin layer (outer layer) 2, and the outer adhesive layer (first adhesive layer) 5 is laminated on the lower surface of the easily adhesive layer 8. That is, it has a laminated structure of the heat resistant resin layer (outer layer) 2/the easily adhesive layer 8/the outer adhesive layer 5/the metal foil layer 4/the inner adhesive layer 6/the heat fusible resin layer (inner layer) 3 (see FIG. 2). In this embodiment, the easily adhesive layer 8 is laminated on the lower surface of the heat resistant resin layer 2 by a Gravure coating method.

In the present invention, the outer layer 2 is formed of a heat resistant resin layer. As the heat resistant resin constituting the heat resistant resin layer 2, a heat resistant resin which does not melt at the heat sealing temperature when heat sealing the packaging material 1 is used. As the heat resistant resin, it is preferable to use a heat resistant resin having a melting point higher than the melting point of the heat fusible resin constituting the heat fusible resin layer 3 by 10° C. or more, and particularly preferable to use a heat resistant resin having a melting point higher than the melting point of the heat fusible resin by 20° C. or more.

The heat resistant resin layer (outer layer) 2 is a member mainly playing a role of ensuring a good formability as a packaging material 1, that is, it mainly plays a role of preventing breakage due to necking of the aluminum foil at the time of forming.

In the present invention, it is necessary that the heat resistant resin layer 2 be composed of a heat resistant resin film having a hot water shrinkage percentage of 1.5 to 12%. When the hot water shrinkage percentage is less than 1.5%, there causes a problem that breakage and/or cracks are likely to occur during forming. On the other hand, when the hot water shrinkage percentage exceeds 12%, delamination (peeling) is likely to occur between the outer layer 2 and the metal foil layer 4. In particular, it is preferable to use a heat resistant resin film having a hot water shrinkage percentage of 1.8 to 11% as the heat resistant resin film. Furthermore, it is more preferable to use a heat resistant resin film having a hot water shrinkage percentage of 1.8% to 6%. As the heat resistant resin film, a heat resistant resin stretched film is preferably used.

Note that the "hot water shrinkage percentage" is a dimensional change rate of a test piece (10 cm×10 cm) of a heat resistant resin stretched film 2 in the stretching direction before and after immersion of the test piece in 95° C. hot water for 30 minutes, and can be obtained by the following equation.

$$\text{Hot water shrinkage percentage (\%)} = \{(X-Y)/X\} \times 100$$

where

X: Dimension in the stretching direction before immersion treatment, and

Y: Dimension in the stretching direction after the immersion treatment

Note that the hot water shrinkage percentage in the case of adopting a biaxially stretched film is an average value of the dimensional change rate in the two stretching directions.

The hot water shrinkage percentage of the heat resistant resin stretched film can be controlled by, for example, adjusting the heat setting temperature at the time of stretching.

As the heat resistant resin layer (outer layer) 2, it is not particularly limited, and examples thereof include a stretched polyamide film such as a stretched nylon film, a stretched polyester film, and the like. Among them, as the heat resistant resin layer 2, it is particularly preferable to use a biaxially stretched polyamide film, a biaxially stretched polybutylene terephthalate (PBT) film, a biaxially stretched polyethylene terephthalate (PET) film, or a biaxially stretched polyethylene naphthalate (PEN) film such as biaxially stretched nylon film, each having a hot water shrinkage percentage of 1.5% to 12%. Further, as the heat resistant resin stretched film 2, it is preferable to use a heat resistant resin biaxially stretched film stretched by a simultaneous biaxial stretching method. The nylon film is not particularly limited, but is exemplified by a 6 nylon film, a 6, 6 nylon film, an MXD nylon film, and the like. Note that the heat resistant resin layer 2 may be made of a single layer (single stretched film) or may be made of multiple layers (e.g., multiple layers composed of a stretched PET film/a stretched nylon film) made of, for example, a stretched polyester film/a stretched polyamide film.

The thickness of the heat resistant resin layer 2 is preferably 12 μm to 50 μm. By setting the thickness to a value equal to or larger than the aforementioned preferred lower limit value, it is possible to secure a sufficient strength as a packaging material. By setting the thickness to a value equal to or smaller than the aforementioned preferred upper limit, it is possible to reduce the stress at the time of stretch forming or drawing, thereby improving the formability.

On the inner surface (the surface on the metal foil layer 4 side) of the heat resistant resin layer 2, an easily adhesive layer 8 is preferably laminated. By coating a polar resin or the like excellent in sticking properties and bonding properties on the inner surface (the surface on the metal foil layer 4 side) of the heat resistant resin layer 2 to thereby laminate an easily adhesive layer 8 thereon, it is possible to improve the adhesive properties and the bonding properties to the outer adhesive layer 5. Thereby, the adhesive properties and the bonding properties between the heat resistant resin layer 2 and the metal foil layer 4 can be improved. Note that it is preferable that the inner surface of the heat resistant resin layer 2 (the surface on which the easily adhesive layer 8 is laminated) be preliminarily subjected to a corona treatment or the like prior to laminating the easily adhesive layer 8 to improve the wettability.

The method for forming the easily adhesive layer 8 is not particularly limited, but, for example, the easily adhesive layer 8 can be formed by applying an aqueous emulsion (water-based emulsion) of one or two kinds of resins selected from the group consisting of an epoxy resin, a urethane resin, an acrylic acid ester resin, a methacrylic acid ester resin, and a polyethyleneimine resin on the surface of the heat resistant resin film 2 and drying the emulsion. The coating method is not particularly limited, and for example, a spray coating method, a gravure roll coating method, a reverse roll coating method, and a lip coating method can be exemplified.

Thus, the easily adhesive layer 8 is preferably configured to contain one or more resins selected from the group consisting of an epoxy resin, a urethane resin, an acrylic acid ester resin, a methacrylic acid ester resin, and a polyethyleneimine resin. By adopting such a configuration, the adhesive strength between the heat resistant resin layer 2 and the outer adhesive layer 5 can be further improved. Thus, when the packaging material is subjected to forming, such as, e.g., deep drawing and stretch forming, and when the packaging material is heat sealed for sealing, it is possible to sufficiently prevent occurrence of delamination (peeling) between the outer layer (heat resistant resin layer) 2 and the metal foil layer 4. Further, even when the packaging material 1 is used under severe environments, such as, e.g., high temperature and high humidity, it is possible to sufficiently prevent delamination (peeling) between the outer layer (heat resistant resin layer) 2 and the metal foil layer 4.

Among them, it is particularly preferably configured that the easily adhesive layer 8 contain a urethane resin and an epoxy resin or contain a (meth) acrylic acid ester resin and an epoxy resin. In this case, it is possible to more sufficiently suppress occurrence of delamination between the outer layer (heat resistant resin layer) 2 and the metal foil layer 4.

In the case of adopting the former configuration, the content mass ratio of the urethane resin/the epoxy resin in the easily adhesive layer 8 is preferably in the range of 98/2 to 40/60.

In this case, the adhesive strength between the heat resistant resin layer 2 and the outer adhesive layer 5 can be further improved. When the content ratio of the urethane resin is larger than the content mass ratio (98/2) of the urethane resin/the epoxy resin, the degree of crosslinking becomes insufficient, resulting in insufficient solvent resistance and adhesive strength, which is not preferable. On the other hand, when the content ratio of the urethane resin becomes smaller than the content mass ratio (40/60) of the urethane resin/the epoxy resin, it will take too much time for crosslinking to complete, which is not preferable. Among them, the content mass ratio of the urethane resin/the epoxy resin in the easily adhesive layer 8 is preferably in the range of 90/10 to 50/50.

Further, in the case of adopting the latter configuration, the content mass ratio of the (meth) acrylic acid ester resin/the epoxy resin in the easily adhesive layer 8 is preferably in the range of 98/2 to 40/60. In this case, the adhesive strength between the heat resistant resin layer 2 and the outer adhesive layer 5 can be further improved. When the content ratio of the (meth) acrylic acid ester resin becomes larger than the content mass ratio (98/2) of the (meth) acrylic acid ester resin/the epoxy resin, the degree of crosslinking becomes insufficient, resulting in insufficient solvent resistance and adhesive strength, which is not preferable. On the other hand, when the content ratio of the (meth) acrylic acid ester resin becomes smaller than the content mass ratio (40/60) of the (meth) acrylic acid ester resin/the epoxy resin, it will take too much time for crosslinking to complete, which is not preferable. Among other things, the content mass ratio of the (meth) acrylic acid ester resin/the epoxy resin in the easily adhesive layer 8 is more preferably in the range of 90/10 to 50/50.

A surfactant, such as, e.g., glycols and ethylene oxide adducts of glycol, may be added to the aqueous resin emulsion (resin-water based emulsion) for forming the easily adhesive layer 8. In this case, a sufficient defoaming effect can be obtained in the aqueous resin emulsion, so that the easily adhesive layer 8 having excellent surface smoothness can be formed. It is preferable that 0.01 mass % to 2.0 mass % of the surfactant be contained in the aqueous resin emulsion.

The resin aqueous emulsion (resin-aqueous based emulsion) for forming the easily adhesive layer 8 preferably contains inorganic fine particles such as silica and colloidal silica. In this case, an anti-blocking effect can be obtained. The inorganic fine particles are preferably added in the amount of 0.1 parts by mass to 10 parts by mass with respect to the resin content of 100 parts by mass.

The formation amount of the easily adhesive layer 8 (solid content after drying) is preferably in the range of 0.01 g/m$^2$ to 0.5 g/m$^2$. When it is 0.01 g/m$^2$ or more, the heat resistant resin layer 2 and the outer adhesive layer 5 can be adhered with each other sufficiently, and when it is 0.5 g/m$^2$ or less, cost reduction can be performed, which is economical.

The content rate of the resin in the easily adhesive layer (after drying) 8 is preferably 88 mass % to 99.9 mass %.

In the present invention, the outer adhesive layer (first adhesive layer) 5 is formed of an adhesive composed of a cured film of an electron beam curable resin composition.

The electron beam curable resin composition is preferably a composition containing an acrylate resin and a photo-radical polymerization initiator. In this case, the time for the electron beam curing can be further shortened, which in turn can further shorten the lead time.

The acrylate resin is not particularly limited, but it is preferable to use, for example, at least one resin selected from the group consisting of a urethane acrylate resin, an epoxy acrylate resin, and a polyester acrylate resin.

The photo-radical polymerization initiator is not particularly limited, but examples thereof include benzophenone, benzoin alkyl ether (benzoethyl ether, benzobutyl ether, etc.), benzyl dimethyl ketal, and the like.

The electron beam curable resin composition preferably further contains one or two compounds selected from the group consisting of a silane coupling agent, acid anhydride, and phosphoric acid-containing (meth) acrylate, in addition to the acrylate resin and the photo-radical polymerization initiator.

The silane coupling agent is not particularly limited, but examples thereof include methyltrimethoxysilane, vinyltrimethoxysilane, vinyltriethoxysilane, allyltrimethoxysilane, 3-(methacryloyloxy) propyltrimethoxysilane, and the like. Among them, as the silane coupling agent, it is preferable to use a silane coupling agent having a carbon-carbon double bond such as vinyltriethoxysilane and allyltrimethoxysilane. In this case, it is possible to strengthen the bond with the adhesive which utilizes the radical polymerization reaction in particular (the adhesive strength of the outer adhesive layer 5 can be improved).

The acid anhydride is not particularly limited, and examples thereof include maleic anhydride, methyl maleic anhydride, itaconic anhydride, himic anhydride, methyl himic acid anhydride, and the like. Among them, as the acid anhydride, it is preferable to use acid anhydride having a carbon-carbon double bond such as maleic anhydride, and the radical polymerization reaction can be further promoted by the acid anhydride having such a double bond.

The phosphoric acid-containing (meth) acrylate (monomer) is not particularly limited, but examples thereof include monomers, such as, e.g., acryloyloxyethyl acid phosphate and bis(2-(meth) acryloyloxyethyl) acid phosphate.

It is preferable that the electron beam curable resin composition further contain one or more resins selected from the group consisting of an epoxy resin, an oxetane resin, and a vinyl ether resin. By using a composition containing such a resin, delamination can be prevented more sufficiently.

In addition, in the case of containing one or more resins selected from the group consisting of the epoxy resin, the oxetane resin, and the vinyl ether resin, it is preferable to simultaneously contain a photo-cationic polymerization initiator. By simultaneously containing a photo-cationic polymerization initiator, delamination can be prevented more sufficiently. The photo-cationic polymerization initiator is not particularly limited, but, for example, an onium salt may be exemplified. The onium salt is not particularly limited, and examples thereof include a sulfonium salt, an iodonium salt, a bromonium salt, a diazonium salt, a chloronium salt, and the like.

The sulfonium salt is not particularly limited, but examples thereof include, for example, triphenylsulfonium hexafluorophosphate, triphenylsulfonium hexafluoroantimonate, triphenylsulfonium tetrakis (pentafluorophenyl) borate, 4,4'-bis [diphenylsulfonio] diphenylsulfide-bishexafluorophosphate, 4,4'-bis [di($\beta$-hydroxyethoxy) phenylsulfonio] diphenylsulfide-bishexafluoroantimonate, 4,4'-bis[di ($\beta$-hydroxyethoxy) phenylsulfonio] diphenylsulfide-bishexafluorophosphate, 7-[di(p-toluyl) sulfonio]-2-isopropylthioxanthone hexafluoroantimonate, 7-[di (p-toluyl) sulfonio]-2-isopropylthioxanthone tetrakis (pentafluorophenyl) borate, 4-phenylcarbonyl-4'-diphenylsulfonio-diphenyl sulfide-hexafluorophosphate, 4-(p-ter-butylphenylcarbonyl)-4'-diphenylsulfonio-diphenyl sulfide-hexafluoroantimonate, 4-(p-ter-butylphenylcarbonyl)-4'-di (p-toluyl) sulfonio-diphenyl sulfide-tetrakis (pentafluorophenyl) borate, triphenylsulfonium bromide, and the like.

The iodonium salt is not particularly limited, but examples thereof include diphenyliodonium tetrakis (pentafluorophenyl) borate, diphenyliodonium hexafluorophosphate, diphenyliodonium hexafluoroantimonate, di(4-nonylphenyl) iodonium hexafluoro phosphate, and the like.

Among other things, it is especially preferable that the electron beam curable resin composition have a composition containing
a) acrylate resin,
b) photo-radical polymerization initiator,
c) acid anhydride,
d) a silane coupling agent,
e) phosphoric acid-containing (meth) acrylate,
f) one or more resins selected from the group consisting of an epoxy resin, an oxetane resin, and a vinyl ether resin, and
g) photo-cationic polymerization initiator.

In this electron beam curable resin composition, it is preferable that the content rate of the acrylate resin be 50 mass % to 98 mass %, the content rate of the silane coupling agent be 0.1 mass % to 5 mass %, the content rate of the acid anhydride be 0.1 mass % to 5 mass %, the content rate of the phosphoric acid-containing (meth) acrylate be 0.1 mass % to 10 mass %, the content rate of the photo-radical polymerization initiator be 0.1 mass % to 5 mass %, the content rate of one or more resins selected from the group consisting of an epoxy resin, an oxetane resin, and a vinyl ether resin be 1 mass % to 20 mass %, and the content rate of the photo-cationic polymerization initiator be 0.5 mass % to 5 mass %.

It is preferable that the thickness (thickness after drying) of the outer adhesive layer (first adhesive layer) 5 be set to 1 μm to 6 μm.

The Young's modulus of the cured film of the electron beam curable resin composition constituting the outer adhesive layer 5 is preferably in the range of 90 MPa to 400 MPa. When the Young's modulus is 90 MPa or more, it is possible to improve the heat resistance of the outer adhesive layer 5 and that it is also possible to sufficiently prevent occurrence of delamination (peeling) between the outer layer 2 and the metal foil layer 4 even if deep depth forming is performed. When the Young's modulus is 400 MPa or less, the adhesive force of the cured film can be sufficiently improved, and the lamination strength under high temperature environments can be sufficiently improved. Especially, the Young's modulus of the cured film of the electron beam curable resin composition constituting the outer adhesive layer 5 is particularly preferably in the range of 140 MPa to 300 MPa. Note the Young's modulus is a Young's modulus measured in accordance with JIS K7127-1999.

In the present invention, the metal foil layer 4 plays a role of imparting a gas barrier property that prevents invasion of oxygen and moisture into the packaging material 1. The metal foil layer 4 is not particularly limited, but examples thereof include an aluminum foil and a copper foil, and an aluminum foil is generally used. The thickness of the metal foil layer 4 is preferably 9 μm to 120 μm. When the thickness is 9 μm or more, it is possible to prevent generation of pinholes at the time of rolling when producing a metal foil, and when the thickness is 120 μm or less, it is possible to reduce the stress at the time of forming, such as, e.g., stretch forming and drawing, thereby improving the formability. Especially, the thickness of the metal foil layer 4 is particularly preferably 20 μm to 100 μm.

It is preferable that the metal foil layer 4 be subjected to a chemical conversion treatment at least on the inner surface (the surface on the inner adhesive layer 6 side). Since such chemical conversion treatment is subjected, corrosion of the surface of the metal foil due to contents (electrolyte, etc., of a battery) can be prevented sufficiently. For example, by performing the following treatment, a chemical conversion treatment is subjected to the metal foil. That is, for example, on the surface of a metal foil subjected to a degreasing treatment, after applying the aqueous solution of any one of 1) to 3) listed below, it is dried and subjected to a chemical conversion treatment.

1) an aqueous solution of a mixture containing:
  a phosphoric acid;
  a chromic acid; and
  at least one compound selected from the group consisting of a metal salt of a fluoride and a non-metal salt of a fluoride.
2) an aqueous solution of a mixture containing:
  a phosphoric acid;
  at least one resin selected from the group consisting of an acryl based resin, a chitosan derivative resin, and a phenol based resin; and
  at least one compound selected from the group consisting of a chromic acid and a chromium (III) salt.
3) an aqueous solution of a mixture containing:
  a phosphoric acid;
  at least one resin selected from the group consisting of an acryl based resin, a chitosan derivative resin, and a phenol based resin;
  at least one compound selected from the group consisting of a chromic acid and a chromium (III) salt; and
  at least one compound selected from the group consisting of a metal salt of a fluoride and a non-metal salt of a fluoride.

The chemical conversion coating is preferably 0.1 mg/m$^2$ to 50 mg/m$^2$ as a chromium adhesion amount (per one side), especially preferably 2 mg/m$^2$ to 20 mg/m$^2$.

The heat fusible resin layer (inner layer) 3 plays a role of imparting excellent chemical resistance also against a highly corrosive electrolyte used in a lithium ion secondary battery and the like and also imparting a heat sealing property to the packaging material.

The resin constituting the heat fusible resin layer 3 is not particularly limited, but examples thereof include polyethylene, polypropylene, ionomer, ethylene ethyl acrylate (EEA), ethylene methyl acrylate (EAA), ethylene methyl methacrylate resin (EMMA), ethylene-vinyl acetate copolymer resin (EVA), maleic anhydride modified polypropylene, maleic anhydride modified polyethylene, and the like.

The thickness of the heat fusible resin layer 3 is preferably set to 15 μm to 30 μm. Setting the thickness to 15 μm or more enables securing of sufficient heat seal strength, and setting the thickness to 30 μm or less contributes to thinning and weight reduction. The heat fusible resin layer 3 is preferably formed of a heat fusible resin unstretched film layer, and the heat fusible resin layer 3 may be a single layer or multiple layers.

The inner adhesive layer (second adhesive layer) 6 is not particularly limited, but it is preferable to use, for example, a curing type adhesive. Examples of the curing type adhesive include a thermosetting type acrylic adhesive, a thermosetting type acid-modified polypropylene adhesive, a thermosetting type polyurethane based adhesive, and the like. Among them, a thermosetting acrylic adhesive is preferably used. In this case, there is an advantage that the heat aging processing temperature for curing promotion can be lowered (for example, 40° C.), and by being able to be low like this, it is possible to obtain an advantageous effect that it can sufficiently prevent white powder generation of the heat fusible resin layer 3 by heat aging processing. The thickness (thickness after drying) of the inner adhesive layer 6 is preferably set to 1 μm to 4 μm.

Figure 4:
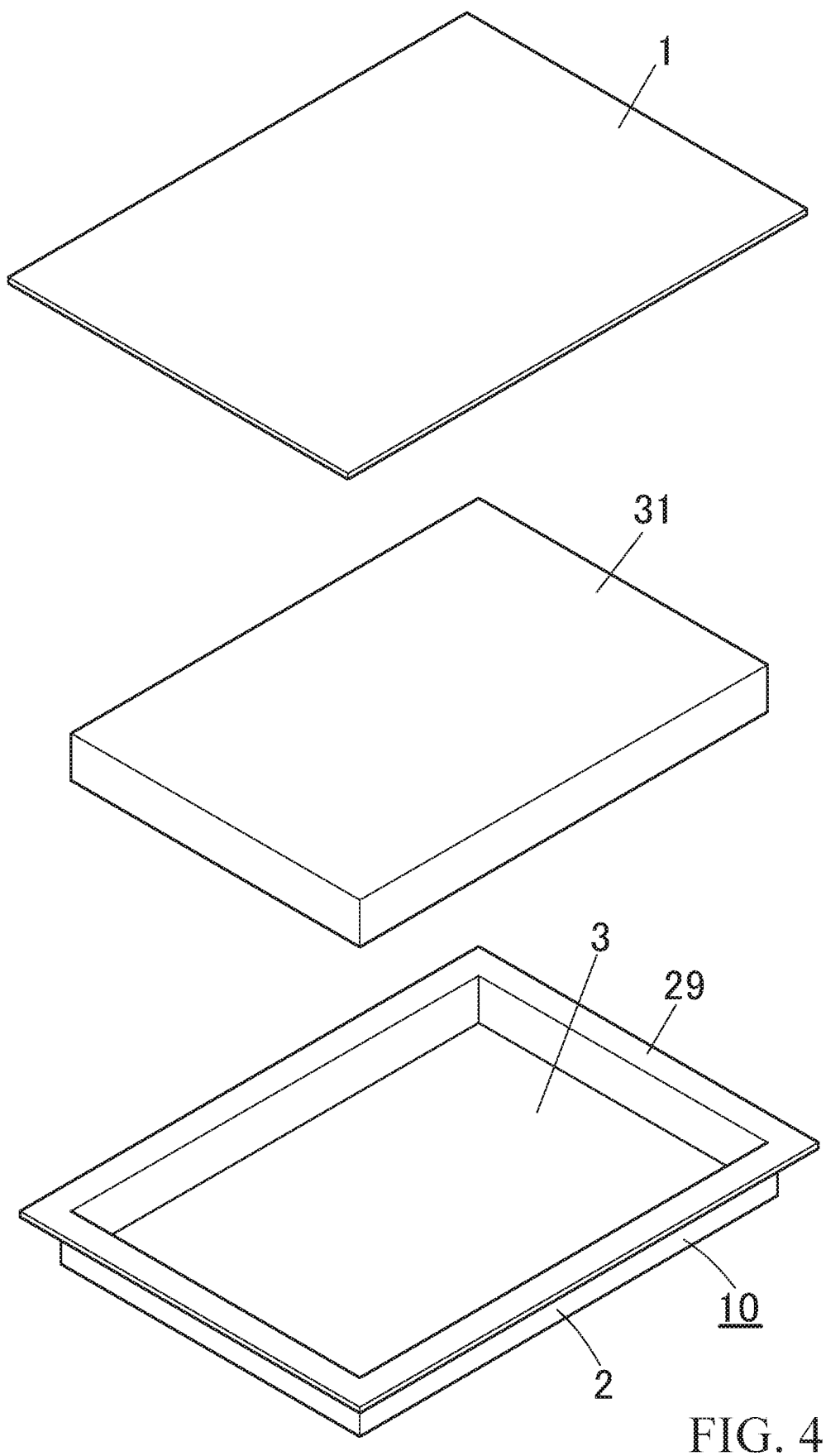
FIG. 4 is a perspective view showing a packaging material (planar shape), a power storage device main body, and a packaging case (three-dimensionally formed product) composing the power storage device of FIG. 3 in a detached state before heat-sealing them.

By forming (deep drawing, stretch forming, etc.) the packaging material 1 for a power storage device of the present invention, a packaging case 10 for a power storage device can be obtained (see FIG. 4). The packaging material 1 of the present invention can be used as it is without being subjected to shaping (see FIG. 4).

Figure 3:
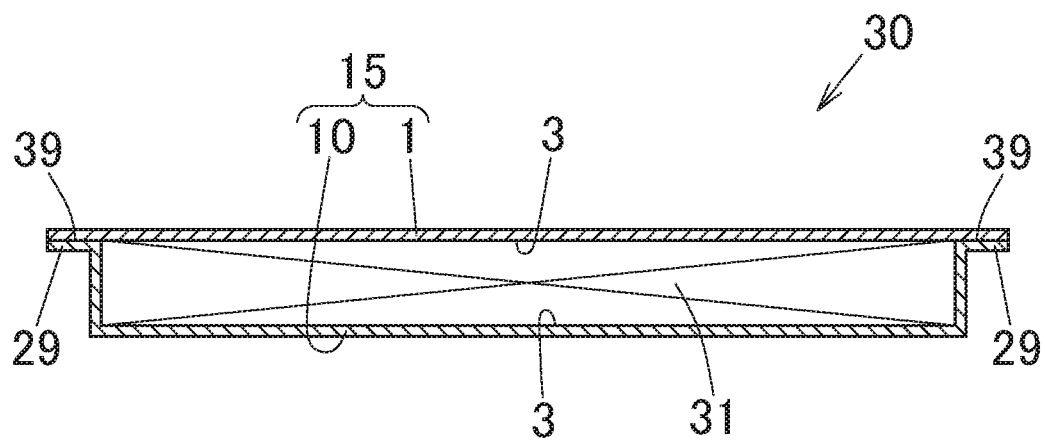
FIG. 3 is a cross-sectional view showing one embodiment of a packaging material for a power storage device according to the present invention.

FIG. 3 shows an embodiment of a power storage device 30 configured by using the packaging material 1 of the present invention. This power storage device 30 is a lithium ion secondary battery. In this embodiment, as shown in FIG. 3 and FIG. 4, a packaging member 15 is constituted by a case 10 obtained by shaping the packaging material 1 and a planar packaging material 1 not subjected to shaping. The power storage device 30 of the present invention is constituted (see FIG. 3 and FIG. 4) by accommodating a substantially rectangular parallelepiped power storage device main body (electrochemical element or the like) 31 in an accommodation recess of an packaging case 10 obtained by shaping the packaging material 1 of the present invention, arranging a packaging material 1 of the present invention on the power storage device main body 31 without being shaped with its inner layer 3 side facing inward (lower side), and heat-sealing the peripheral portion of the inner layer 3 of the planar packaging material 1 and the inner layer 3 of the flange portion (sealing peripheral portion) 29 of the packaging case 10 to be heat-sealed. The inner side surface of the accommodation recess of the packaging case 10 is an inner layer (heat fusible layer) 3, and the outer surface of the accommodation recess is an outer layer (heat resistant resin layer) 2 (see FIG. 4).

In FIG. 3, the reference numeral 39 denotes a heat seal portion in which the peripheral portion of the packaging material 1 and the flange portion (sealing peripheral portion) 29 of the packaging case 10 are joined (fused). Note that, in the power storage device 30, the tip end portion of a tab lead connected to the power storage device main body portion 31 is led to the outside of the packaging member 15, but the illustration is omitted.

Although the power storage device main body 31 is not particularly limited, it is exemplified by, for example, a battery main body, a capacitor main body, and an electrical condenser main body.

It is preferable that the width of the heat seal portion 39 be set to 0.5 mm or more. When it is set to 0.5 mm or more, sealing can be assuredly performed. Particular, it is preferable that the width of the heat seal portion 39 be set to 3 mm to 15 mm.

In the above-described embodiment, the packaging member 15 is configured by the packaging case 10 obtained by shaping the packaging material 1 and the planar packaging material 1 (see FIG. 3 and FIG. 4). However, the present invention is not particularly limited to such a combination. For example, the packaging member 15 may be constituted by a pair of packaging materials 1, or may be constituted by a pair of packaging cases 10.

Next, a preferred example of a method for producing a packaging material for a power storage device according to the present invention will be described. First, a first laminate in which a heat resistant resin film 2 having a hot water shrinkage percentage of 1.5% to 12% is adhered to one surface of a metal foil layer 4 via the electron beam curable resin composition is prepared (First Preparation Step).

Next, an electron beam is irradiated to the first laminate from the side of the heat resistant resin film to cure the electron beam curable resin composition (Curing Step). Examples of the electron beam include ultraviolet light, visible light, X-rays, γ-rays, and the like. In the case of irradiating the ultraviolet light or the visible light, the irradiation light amount is not particularly limited, but it is preferably set to 50 mJ/cm$^2$ to 1,000 mJ/cm$^2$.

Next, a second laminate in which a heat fusible resin film 3 is bonded to the other surface of the metal foil layer 4 of the first laminate which has undergone the curing step via a thermosetting adhesive is prepared (Second Preparation Step). The thermosetting adhesive is not particularly limited, and examples thereof include a thermosetting type acrylic adhesive, a thermosetting type polypropylene adhesive, a thermosetting type polyurethane adhesive, and the like.

Next, a heat treatment is performed on the second laminate to cure the thermosetting adhesive (Aging Treatment Step). Through the aging treatment step, the packaging material 1 for a power storage device of the present invention can be obtained. The heat treatment is preferably carried out at 35° C. to 45° C. Although the time of the heat treatment (heat aging processing) is not particularly limited, for example, in the case of using a thermosetting acrylic adhesive as a thermosetting adhesive, the heat treatment is preferably performed for 3 days to 15 days.

The above-described production method is a mere preferable example, and the packaging material 1 for a power storage device of the present invention is not limited to the one produced by the above-described production method.

EXAMPLES

Next, specific examples of the present invention will be described, but the present invention is not particularly limited to those of these examples.

Example 1

A chemical conversion coating was formed by applying a chemical conversion treatment solution comprising a phosphoric acid, a polyacrylic acid (acryl based resin), a chromium (III) salt compound, water, alcohol on both sides of 35 μm thick aluminum foil (aluminum foil of A8079 specified in JIS H4160) 4, and thereafter drying it at 180° C. The chromium adhesion amount of this chemical conversion coating was 10 mg/m$^2$ per one side.

Next, a light curing resin composition (outer adhesive) containing 95 parts by mass of an urethane acrylate resin having two acryloyl groups, 5 parts by mass of a benzophenone was applied on one surface of the aluminum conversion treated aluminum foil 4 so that the mass after drying became 4 g/m$^2$.

On the other hand, a biaxially stretched polyamide film 2 with an easily adhesive layer 8 was obtained by applying a resin obtained by mixing 70 parts by mass of an urethane resin and 30 parts by mass of an epoxy resin on one side of a biaxially stretched polyamide film 2 having a hot water shrinkage percentage of 2.0% and a thickness of 15 μm by a spray coating method, and thereafter drying to thereby form an easily adhesive layer 8 having a thickness of 0.05 μm. The biaxially stretched polyamide film 2 having the hot water shrinkage percentage of 2.0% was obtained by setting the heat setting temperature at 214° C. when biaxially stretching the polyamide film.

The easily adhesive layer side of the polyamide film 2 with the easily adhesive layer 8 was superimposed on the outer adhesive coated side of one side of the aluminum foil 4 and laminated to obtain a first laminate. Ultraviolet rays of 300 mJ/cm$^2$ was irradiated on the first laminate from the polyamide film 2 side to light cure the light curing resin composition to form a cured film (outer adhesive layer 5).

Next, an inner adhesive composed of a thermosetting type acid-modified polypropylene adhesive was applied to the other surface of the aluminum foil 4 of the first laminate so that the mass after drying became 2.5 g/m$^2$, and then an unstretched polypropylene film 3 having a thickness of 30 μm was laminated on the inner agent coated side to obtain a second laminate.

The second laminate was subjected to heat aging processing by placing in an environment of 40° C. for 9 days to cure the thermosetting type inner adhesive to form an inner adhesive layer 6 to obtain a packaging material 1 for a power storage device.

Example 2

A packaging material 1 for a power storage device having the configuration shown in FIG. 2 was obtained in the same manner as in Example 1 except that a light curing resin composition containing 90 parts by mass of an urethane acrylate resin having two acryloyl groups, 0.2 parts by mass of benzophenone, 5 parts by mass of maleic anhydride, and 5 parts by mass of methyltrimethoxysilane were used as a light curing resin composition (outer adhesive).

Example 3

A packaging material 1 for a power storage device having the configuration shown in FIG. 2 was obtained in the same manner as in Example 1 except that a light curing resin composition containing 94 parts by mass of an urethane acrylate resin having two acryloyl groups, 5 parts by mass of benzophenone, 0.2 parts by mass of maleic anhydride, and 0.2 parts by mass of methyltrimethoxysilane were used as a light curing resin composition (outer adhesive).

Example 4

A packaging material 1 for a power storage device having the configuration shown in FIG. 2 was obtained in the same manner as in Example 1 except that a light curing resin composition containing 91 parts by mass of an urethane acrylate resin having two acryloyl groups, 3 parts by mass of benzophenone, 3 parts by mass of maleic anhydride, 3 parts by mass of methyltrimethoxysilane, and 0.3 parts by mass of acryloyloxyethyl acid phosphate were used as a light curing resin composition (outer adhesive).

Example 5

A packaging material 1 for a power storage device having the configuration shown in FIG. 2 was obtained in the same manner as in Example 1 except that a light curing resin composition containing 90 parts by mass of an urethane acrylate resin having two acryloyl groups, 0.2 parts by mass of benzophenone, 0.2 parts by mass of maleic anhydride, 0.2 parts by mass of methyltrimethoxysilane, and 10 parts by mass of acryloyloxyethyl acid phosphate were used as a light curing resin composition (outer adhesive).

Example 6

A packaging material 1 for a power storage device having the configuration shown in FIG. 2 was obtained in the same manner as in Example 1 except that a light curing resin composition containing 90 parts by mass of an urethane acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 2 parts by mass of an epoxy resin, and 0.5 parts by mass of triphenylsulfonium hexafluorophosphate (sulfonium salt) were used as a light curing resin composition (outer adhesive).

Example 7

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 8

A packaging material 1 for a power storage device having the configuration shown in FIG. 2 was obtained in the same manner as in Example 1 except that a light curing resin composition containing 70 parts by mass of an urethane acrylate resin having two acryloyl groups, 1 part by mass of benzophenone, 1 part by mass of maleic anhydride, 1 part by mass of methyltrimethoxysilane, 2 parts by mass of acryloyloxyethyl acid phosphate, 20 parts by mass of an epoxy resin, and 5 parts by mass of triphenylsulfonium hexafluorophosphate were used as a light curing resin composition (outer adhesive).

Example 9

A packaging material 1 for a power storage device having the configuration shown in FIG. 2 was obtained in the same manner as in Example 7 except that a biaxially stretched polyamide film having a hot water shrinkage percentage of 5.0% was used as the biaxially stretched polyamide film 2. The biaxially stretched polyamide film having the hot water shrinkage percentage of 5.0% was obtained by setting the heat setting temperature at 191° C. when biaxially stretching the polyamide film.

Example 10

A packaging material 1 for a power storage device having the configuration shown in FIG. 2 was obtained in the same manner as in Example 7 except that a biaxially stretched polyamide film having a hot water shrinkage percentage of 10.0% was used as the biaxially stretched polyamide film 2. The biaxially stretched polyamide film having the hot water shrinkage percentage of 10.0% was obtained by setting the heat setting temperature at 160° C. when biaxially stretching the polyamide film.

Example 11

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 12

A packaging material 1 for a power storage device having the configuration shown in FIG. 2 was obtained in the same manner as in Example 1 except that a light curing resin composition containing 82 parts by mass of a polyester acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 13

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzoin ethyl ether, 2 parts by mass of maleic anhydride, 2 parts by mass of methyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 14

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzyl dimethyl ketal, 2 parts by mass of maleic anhydride, 2 parts by mass of methyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 15

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 8 parts by mass of an oxetane resin, and 2 parts by mass of triphenylsulfonium hexafluorophosphate were used as a light curing resin composition (outer adhesive).

Example 16

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 8 parts by mass of a vinyl ether resin, and 2 parts by mass of triphenylsulfonium hexafluorophosphate were used as a light curing resin composition (outer adhesive).

Example 17

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of methyltrimethoxysilane, 2 parts by mass of acryloyloxyethyl acid phosphate, 8 parts by mass of an epoxy resin, and 2 parts by mass of diphenyliodonium hexafluorophosphate (iodonium salt) were used as a light curing resin composition (outer adhesive).

Example 18

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of itaconic anhydride, 2 parts by mass of methyltrimethoxysilane, 2 parts by mass of acryloyloxyethyl acid phosphate, 8 parts by mass of an oxetane resin, and 2 parts by mass of triphenylsulfonium hexafluorophosphate were used as a light curing resin composition (outer adhesive).

Example 19

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of anhydrous himic acid, 2 parts by mass of methyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 20

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of vinyl triethoxysilane, 2 parts by mass of acryloyloxyethyl acid phosphate, 8 parts by mass of an oxetane resin, and 2 parts by mass of triphenylsulfonium hexafluorophosphate were used as a light curing resin composition (outer adhesive).

Example 21

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of allyltrimethoxysilane, 2 parts by mass of acryloyloxyethyl acid phosphate, 8 parts by mass of an epoxy resin, and 2 parts by mass of triphenylsulfonium hexafluorophosphate were used as a light curing resin composition (outer adhesive).

Example 22

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, 2 parts by mass of maleic anhydride, 2 parts by mass of methyltrimethoxysilane, 2 parts by mass of bis(2-methacryloyloxyethyl) acid phosphate, 8 parts by mass of an epoxy resin, and 2 parts by mass of triphenylsulfonium hexafluorophosphate were used as a light curing resin composition (outer adhesive).

Example 23

A packaging material 1 for a power storage device having the configuration shown in FIG. 2 was obtained in the same manner as in Example 1 except that a light curing resin composition containing 99 parts by mass of an urethane acrylate resin having two acryloyl groups, and 1 part by mass of a benzophenone were used as a light curing resin composition (outer adhesive).

Example 24

A packaging material 1 for a power storage device having the configuration shown in FIG. 2 was obtained in the same manner as in Example 1 except that a light curing resin composition containing 45 parts by mass of an urethane acrylate resin having two acryloyl groups, 5 parts by mass of benzophenone, 3 parts by mass of maleic anhydride, 2 parts by mass of methyltrimethoxysilane, 20 parts by mass of acryloyloxyethyl acid phosphate, 20 parts by mass of an epoxy resin, and 5 parts by mass of triphenylsulfonium hexafluorophosphate were used as a light curing resin composition (outer adhesive).

Example 25

A packaging material 1 for a power storage device having the configuration shown in FIG. 2 was obtained in the same manner as in Example 1 except that a light curing resin composition containing 54 parts by mass of an urethane acrylate resin having two acryloyl groups, 1 part by mass of benzophenone, 1 part by mass of maleic anhydride, 2 parts by mass of methyltrimethoxysilane, 2 parts by mass of acryloyloxyethyl acid phosphate, 30 parts by mass of an epoxy resin, and 8 parts by mass of triphenylsulfonium hexafluorophosphate were used as a light curing resin composition (outer adhesive).

Example 26

A packaging material 1 for a power storage device having the configuration shown in FIG. 2 was obtained in the same manner as in Example 1 except that a light curing resin composition containing 82 parts by mass of an urethane acrylate resin having two acryloyl groups, 2 parts by mass of benzophenone, and 8 parts by mass of methyltrimethoxysilane were used as a light curing resin composition (outer adhesive).

Example 27

A packaging material 1 for a power storage device having the configuration shown in FIG. 2 was obtained in the same manner as in Example 1 except that a light curing resin composition containing 79 parts by mass of an urethane acrylate resin having two acryloyl groups, 2 parts by mass of benzophenone, 2 parts by mass of maleic anhydride, 2 parts by mass of methyltrimethoxysilane, and 15 parts by mass of acryloyloxyethyl acid phosphate were used as a light curing resin composition (outer adhesive).

Example 28

A packaging material 1 for a power storage device having the structure shown in FIG. 1 was obtained in the same manner as in Example 7 except that the easily adhesive layer 8 was not provided.

Comparative Example 1

A packaging material 1 for a power storage device was obtained in the same manner as in Example 7 except that a biaxially stretched polyamide film having a hot water shrinkage percentage of 1.0% was used as the biaxially stretched polyamide film 2. The biaxially stretched polyamide film having the hot water shrinkage percentage of 1.0% was obtained by setting the heat setting temperature at 221° C. when biaxially stretching the polyamide film.

Comparative Example 2

A packaging material 1 for a power storage device was obtained in the same manner as in Example 7 except that a biaxially stretched polyamide film having a hot water shrinkage percentage of 15.0% was used as the biaxially stretched polyamide film 2. The biaxially stretched polyamide film having the hot water shrinkage percentage of 15.0% was obtained by setting the heat setting temperature at 135° C. when biaxially stretching the polyamide film.

Comparative Example 3

A chemical conversion coating was formed by applying a chemical conversion treatment solution comprising a phosphoric acid, a polyacrylic acid (acryl based resin), a chromium (III) salt compound, water, alcohol on both sides of 35 μm thick aluminum foil (aluminum foil of A8079 specified in JIS H4160) 4, and thereafter drying it at 180° C. The chromium adhesion amount of this chemical conversion coating was 10 mg/m² per one side.

Next, a heat curing type adhesive (outer adhesive) containing 80 parts by mass of an acid-modified polyolefin resin and 20 parts by mass of polyisocyanate was sprayed on one surface of the aluminum conversion treated aluminum foil 4 so that the mass after drying became 4 g/m².

On the other hand, a biaxially stretched polyamide film 2 with an easily adhesive layer 8 was obtained by applying a resin obtained by mixing 70 parts by mass of an urethane resin and 30 parts by mass of an epoxy resin on one surface of a biaxially stretched polyamide film 2 having a hot water shrinkage percentage of 2.0% and a thickness of 15 μm by a spray coating method, and thereafter drying to thereby form an easily adhesive layer 8 having a thickness of 0.05 μm. The biaxially stretched polyamide film 2 having the hot water shrinkage percentage of 2.0% was obtained by setting the heat setting temperature at 214° C. when biaxially stretching the polyamide film.

The easily adhesive layer side of the polyamide film 2 with the easily adhesive layer 8 was superimposed on the outer adhesive coated side of one side of the aluminum foil 4 and laminated to obtain a first laminate. The first laminate was place in an environment of 60° C. for 9 days and subjected to heat aging processing to cure the outer adhesive.

Next, an inner adhesive composed of a thermosetting type acid-modified polypropylene adhesive was applied to the other surface of the aluminum foil 4 of the first laminate after the heat aging processing so that the mass after drying became 2.5 g/m², and then an unstretched polypropylene film 3 having a thickness of 30 μm was laminated on the inner agent coated side to obtain a second laminate.

The second laminate was subjected to heat aging processing by placing in an environment of 40° C. for 9 days to cure the thermosetting type inner adhesive to form an inner adhesive layer 6 to obtain a packaging material 1 for a power storage device.

TABLE 1

|  |  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Light curing resin composition/ Mass Parts | A | Urethane acrylate resin | 95 | 90 | 94 | 91 | 90 | 90 | 82 | 70 | 82 | 82 |
|  |  | Epoxy acrylate resin | — | — | — | — | — | — | — | — | — | — |
|  |  | Polyester acrylate resin | — | — | — | — | — | — | — | — | — | — |
|  | B | Benzophenone | 5 | 0.2 | 5 | 3 | 0.2 | 2 | 2 | 1 | 2 | 2 |
|  |  | Benzoinethyl ether | — | — | — | — | — | — | — | — | — | — |
|  |  | Benzyl dimethyl ketal | — | — | — | — | — | — | — | — | — | — |
|  | C | Maleic anhydride | — | 5 | 0.2 | 3 | 0.2 | 2 | 2 | 1 | 2 | 2 |
|  |  | Itaconic anhydride | — | — | — | — | — | — | — | — | — | — |
|  |  | Anhydrous Himic acid | — | — | — | — | — | — | — | — | — | — |

TABLE 1-continued

|  |  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
|  | D | Methyltrimethoxysilane | — | 5 | 0.2 | 3 | 0.2 | 2 | 2 | 1 | 2 | 2 |
|  |  | Vinyl triethoxysilane | — | — | — | — | — | — | — | — | — | — |
|  |  | Allyltrimethoxysilane | — | — | — | — | — | — | — | — | — | — |
|  | E | Phosphoric acid acrylate X | — | — | — | 0.3 | 10 | 2 | 2 | 2 | 2 | 2 |
|  |  | Phosphoric acid acrylate Y | — | — | — | — | — | — | — | — | — | — |
|  | F | Epoxy resin | — | — | — | — | — | 2 | 8 | 20 | 8 | 8 |
|  |  | Oxetane resin | — | — | — | — | — | — | — | — | — | — |
|  |  | Vinyl ether resin | — | — | — | — | — | — | — | — | — | — |
|  | G | Sulfonium salt V | — | — | — | — | — | 0.5 | 2 | 5 | 2 | 2 |
|  |  | Iodonium salt W | — | — | — | — | — | — | — | — | — | — |
| Outer layer hydrothermal shrinkage (%) |  |  | 2.0 | 2.0 | 2.0 | 2.0 | 2.0 | 2.0 | 2.0 | 2.0 | 5.0 | 10.0 |
| Presence or absence of easily adhesion layer |  |  | Yes | Yes | Yes | Yes | Yes | Yes | Yes | Yes | Yes | Yes |
| Evaluation | Cured film Young's modulus (MPa) |  | 500 | 460 | 420 | 420 | 420 | 400 | 250 | 90 | 250 | 250 |
|  | Formability |  | ○ | ○ | ○ | ○ | ○ | ○ | ○ | ○ | ○ | ○ |
|  | Sealing property (presence/absence of peeling) |  | Δ | ○ | ○ | ○ | ○ | ○ | ○ | ○ | ○ | ○ |
|  | Hot water resistant (presence or absence of peeling) |  | Δ | Δ | ○ | ○ | ○ | ○ | ○ | ○ | ○ | ○ |
|  | High temperature lamination strength |  | Δ | Δ | Δ | Δ | Δ | ○ | ○ | ○ | ○ | ○ |

TABLE 2

|  |  |  | Ex. 11 | Ex. 12 | Ex. 13 | Ex. 14 | Ex. 15 |
|---|---|---|---|---|---|---|---|
| Light curing resin composition/ Mass Parts | A | Urethane acrylate resin | — | — | 82 | 82 | 82 |
|  |  | Epoxy acrylate resin | 82 | — | — | — | — |
|  |  | Polyester acrylate resin | — | 82 | — | — | — |
|  | B | Benzophenone | 2 | 2 | — | — | 2 |
|  |  | Benzoinethyl ether | — | — | 2 | — | — |
|  |  | Benzyl dimethyl ketal | — | — | — | 2 | — |
|  | C | Maleic anhydride | 2 | 2 | 2 | 2 | 2 |
|  |  | Itaconic anhydride | — | — | — | — | — |
|  |  | Anhydrous Himic acid | — | — | — | — | — |
|  | D | Methyltrimethoxysilane | 2 | 2 | 2 | 2 | 2 |
|  |  | Vinyl triethoxysilane | — | — | — | — | — |
|  |  | Allyltrimethoxysilane | — | — | — | — | — |
|  | E | Phosphoric acid acrylate X | 2 | 2 | 2 | 2 | 2 |
|  |  | Phosphoric acid acrylate Y | — | — | — | — | — |
|  | F | Epoxy resin | 8 | 8 | 8 | 8 | — |
|  |  | Oxetane resin | — | — | — | — | 8 |
|  |  | Vinyl ether resin | — | — | — | — | — |
|  | G | Sulfonium salt V | 2 | 2 | 2 | 2 | 2 |
|  |  | Iodonium salt W | — | — | — | — | — |
| Outer layer hydrothermal shrinkage (%) |  |  | 2.0 | 2.0 | 2.0 | 2.0 | 2.0 |
| Presence or absence of easily adhesion layer |  |  | Yes | Yes | Yes | Yes | Yes |
| Evaluation | Cured film Young's modulus (MPa) |  | 260 | 280 | 240 | 250 | 250 |
|  | Formability |  | ○ | ○ | ○ | ○ | ○ |
|  | Sealing property (presence/absence of peeling) |  | ○ | ○ | ○ | ○ | ○ |
|  | Hot water resistant (presence or absence of peeling) |  | ○ | ○ | ○ | ○ | ○ |
|  | High temperature lamination strength |  | ○ | ○ | ○ | ○ | ○ |

|  |  |  | Ex. 16 | Ex. 17 | Ex. 18 | Ex. 19 | Ex. 20 |
|---|---|---|---|---|---|---|---|
| Light curing resin composition/ Mass Parts | A | Urethane acrylate resin | 82 | 82 | 82 | 82 | 82 |
|  |  | Epoxy acrylate resin | — | — | — | — | — |
|  |  | Polyester acrylate resin | — | — | — | — | — |
|  | B | Benzophenone | 2 | 2 | 2 | 2 | 2 |
|  |  | Benzoinethyl ether | — | — | — | — | — |
|  |  | Benzyl dimethyl ketal | — | — | — | — | — |
|  | C | Maleic anhydride | 2 | 2 | — | — | 2 |
|  |  | Itaconic anhydride | — | — | 2 | — | — |
|  |  | Anhydrous Himic acid | — | — | — | 2 | — |
|  | D | Methyltrimethoxysilane | 2 | 2 | 2 | 2 | — |
|  |  | Vinyl triethoxysilane | — | — | — | — | 2 |
|  |  | Allyltrimethoxysilane | — | — | — | — | — |

TABLE 2-continued

|  |  |  |  |  |  |  |  |
|---|---|---|---|---|---|---|---|
|  | E | Phosphoric acid acrylate X | 2 | 2 | 2 | 2 | 2 |
|  |  | Phosphoric acid acrylate Y | — | — | — | — | — |
|  | F | Epoxy resin | — | 8 | — | 8 | — |
|  |  | Oxetane resin | — | — | 8 | — | 8 |
|  |  | Vinyl ether resin | 8 | — | — | — | — |
|  | G | Sulfonium salt V | 2 | — | 2 | 2 | 2 |
|  |  | Iodonium salt W | — | 2 | — | — | — |
| Outer layer hydrothermal shrinkage (%) |  |  | 2.0 | 2.0 | 2.0 | 2.0 | 2.0 |
| Presence or absence of easily adhesion layer |  |  | Yes | Yes | Yes | Yes | Yes |
| Evaluation | Cured film Young's modulus (MPa) |  | 250 | 250 | 250 | 250 | 250 |
|  | Formability |  | ○ | ○ | ○ | ○ | ○ |
|  | Sealing property (presence/absence of peeling) |  | ○ | ○ | ○ | ○ | ○ |
|  | Hot water resistant (presence or absence of peeling) |  | ○ | ○ | ○ | ○ | ○ |
|  | High temperature lamination strength |  | ○ | ○ | ○ | ○ | ○ |

TABLE 3

|  |  |  | Ex. 21 | Ex. 22 | Ex. 23 | Ex. 24 |
|---|---|---|---|---|---|---|
| Light curing resin composition/ Mass Parts | A | Urethane acrylate resin | 82 | 82 | 99 | 45 |
|  |  | Epoxy acrylate resin | — | — | — | — |
|  |  | Polyester acrylate resin | — | — | — | — |
|  | B | Benzophenone | 2 | 2 | 1 | 5 |
|  |  | Benzoinethyl ether | — | — | — | — |
|  |  | Benzyl dimethyl ketal | — | — | — | — |
|  | C | Maleic anhydride | 2 | 2 | — | 3 |
|  |  | Itaconic anhydride | — | — | — | — |
|  |  | Anhydrous Himic acid | — | — | — | — |
|  | D | Methyltrimethoxysilane | — | 2 | — | 2 |
|  |  | Vinyl triethoxysilane | — | — | — | — |
|  |  | Allyltrimethoxysilane | 2 | — | — | — |
|  | E | Phosphoric acid acrylate X | 2 | — | — | 20 |
|  |  | Phosphoric acid acrylate Y | — | 2 | — | — |
|  | F | Epoxy resin | 8 | 8 | — | 20 |
|  |  | Oxetane resin | — | — | — | — |
|  |  | Vinyl ether resin | — | — | — | — |
|  | G | Sulfonium salt V | 2 | 2 | — | 5 |
|  |  | Iodonium salt W | — | — | — | — |
| Outer layer hydrothermal shrinkage (%) |  |  | 2.0 | 2.0 | 2.0 | 2.0 |
| Presence or absence of easily adhesion layer |  |  | Yes | Yes | Yes | Yes |
| Evaluation | Cured film Young's modulus (MPa) |  | 250 | 250 | 520 | 60 |
|  | Formability |  | ○ | ○ | ○ | ○ |
|  | Sealing property (presence/absence of peeling) |  | ○ | ○ | ○ | Δ |
|  | Hot water resistant (presence or absence of peeling) |  | ○ | ○ | ○ | ○ |
|  | High temperature lamination strength |  | ○ | ○ | Δ | ○ |

|  |  |  | Ex. 25 | Ex. 26 | Ex. 27 | Ex. 28 |
|---|---|---|---|---|---|---|
| Light curing resin composition/ Mass Parts | A | Urethane acrylate resin | 54 | 82 | 79 | 82 |
|  |  | Epoxy acrylate resin | — | — | — | — |
|  |  | Polyester acrylate resin | — | — | — | — |
|  | B | Benzophenone | 1 | 2 | 2 | 2 |
|  |  | Benzoinethyl ether | — | — | — | — |
|  |  | Benzyl dimethyl ketal | — | — | — | — |
|  | C | Maleic anhydride | 1 | 8 | 2 | 2 |
|  |  | Itaconic anhydride | — | — | — | — |
|  |  | Anhydrous Himic acid | — | — | — | — |
|  | D | Methyltrimethoxysilane | 2 | 8 | 2 | 2 |
|  |  | Vinyl triethoxysilane | — | — | — | — |
|  |  | Allyltrimethoxysilane | — | — | — | — |
|  | E | Phosphoric acid acrylate X | 2 | — | 15 | 2 |
|  |  | Phosphoric acid acrylate Y | — | — | — | — |
|  | F | Epoxy resin | 30 | — | — | 8 |
|  |  | Oxetane resin | — | — | — | — |
|  |  | Vinyl ether resin | — | — | — | — |

TABLE 3-continued

|  |  |  |  |  |  |
|---|---|---|---|---|---|
|  | G | Sulfonium salt V | 8 | — | — | 2 |
|  |  | Iodonium salt W | — | — | — | — |
| Outer layer hydrothermal shrinkage (%) |  |  | 2.0 | 2.0 | 2.0 | 2.0 |
| Presence or absence of easily adhesion layer |  |  | Yes | Yes | Yes | None |
| Evaluation | Cured film Young's modulus (MPa) |  | 40 | 530 | 510 | 250 |
|  | Formability |  | ○ | ○ | ○ | ○ |
|  | Sealing property (presence/absence of peeling) |  | Δ | ○ | ○ | ○ |
|  | Hot water resistant (presence or absence of peeling) |  | Δ | Δ | Δ | ○ |
|  | High temperature lamination strength |  | ○ | Δ | Δ | Δ |

TABLE 4

|  |  |  | Comp. Ex. 1 | Comp. Ex. 2 | Comp. Ex. 3 |
|---|---|---|---|---|---|
| Light curing resin composition/ Mass Parts | A | Urethane acrylate resin | 82 | 82 | (Thermosetting resin composition) |
|  |  | Epoxy acrylate resin | — | — | 80 parts by mass of acid-modified polyolefin resin + 20 parts by mass of polyisocyanate |
|  |  | Polyester acrylate resin | — | — |  |
|  | B | Benzophenone | 2 | 2 |  |
|  |  | Benzoinethyl ether | — | — |  |
|  |  | Benzyl dimethyl ketal | — | — |  |
|  | C | maleic anhydride | 2 | 2 |  |
|  |  | Itaconic anhydride | — | — |  |
|  |  | Anhydrous Himic acid | — | — |  |
|  | D | Methyltrimethoxysilane | 2 | 2 |  |
|  |  | Vinyl triethoxysilane | — | — |  |
|  |  | Allyltrimethoxysilane | — | — |  |
|  | E | Phosphoric acid acrylate X | 2 | 2 |  |
|  |  | Phosphoric acid acrylate Y | — | — |  |
|  | F | Epoxy resin | 8 | 8 |  |
|  |  | Oxetane resin | — | — |  |
|  |  | Vinyl ether resin | — | — |  |
|  | G | Sulfonium salt V | 2 | 2 |  |
|  |  | Iodonium salt W | — | — |  |
| Outer layer hydrothermal shrinkage (%) |  |  | 1.0 | 15.0 | 2.0 |
| Presence or absence of easily adhesion layer |  |  | Yes | Yes | Yes |
| Evaluation | Cured film Young's modulus (MPa) |  | 250 | 250 | 250 |
|  | Formability |  | x | ○ | ○ |
|  | Sealing property (presence/absence of peeling) |  | ○ | x | ○ |
|  | Hot water resistant (presence or absence of peeling) |  | ○ | x | ○ |
|  | High temperature lamination strength |  | ○ | ○ | x |

In Tables 1 to 4, acryloyloxyethyl acid phosphate is expressed as "phosphoric acid acrylate X", bis (2-methacryloyloxyethyl) acid phosphate is expressed as "phosphoric acid acrylate Y", triphenylsulfonium hexafluorophosphate is expressed as "sulfonium salt V", diphenyliodonium hexafluorophosphate is expressed as "iodonium salt W".

Also note that, in Tables 1 to 4, in the field of the light curing resin composition, "A" means an acrylate resin, "B" means a photo-radical polymerization initiator, "C" means acid anhydride, "D" means a silane coupling agent, "E" means phosphoric acid-containing (meth) acrylate, "F" means an epoxy resin, an oxetane resin, or a vinyl ether resin, and "G" means a photo-cationic polymerization initiator.

Evaluation was performed on each packaging material for a power storage device obtained as described above based on the following measurement method and evaluation method.

<Young's Modulus Measurement Method>

The Young's modulus (MPa) of the cured film in which each outer adhesive (light curing resin composition) used in Examples and Comparative Examples was subjected to light curing was measured in accordance with JIS K7127-1999. Specifically, after coating each outer adhesive (light curing resin composition) on a glass plate with a thickness of 50 μm, light curing resin composition was light cured by irradiating ultraviolet rays of 300 mJ/cm$^2$ to obtain a cured film having a thickness of 46 μm was obtained. After removing the cured film from the glass plate, it was cut into a size of 15 mm in width×100 mm in length to prepare a test piece. The test piece was subjected to a tensile test using a strograph (AGS-5kNX) manufactured by Shimadzu Corporation at a pulling rate of 200 mm/minute to measure Young's modulus (MPa).

<Formability Evaluation Method>

Deep drawing was performed on a packaging material in a substantially rectangular parallelepiped shape (55 mm in length×35 mm in width×each depth) (a substantially rectangular parallelepiped shape with one surface opened) using a deep drawing tool manufactured by Amada Co., Ltd. That is, deep drawing was performed by changing the forming depth. Then, the presence or absence of pinholes and/or cracks at the corner portion of the obtained formed product was examined. The "maximum forming depth (mm)" in which no pinholes and/cracks occurred was examined and evaluated based on the following criteria. The presence or absence of pinholes and/or cracks was examined by a light transmission method in a dark room.
(Judgment Criteria)
"○": Maximum forming depth at which no pinholes and/or cracks occurred was 5 mm or more (Passed)
"Δ": Maximum forming depth at which no pinholes and/or cracks occurred was 4 mm or more but less than 5 mm (Passed)
"x": Maximum forming depth at which no pinholes and/or cracks occurred was less than 4 mm (Failed)
<Evaluation Method of Sealing Property>
(Evaluation on Presence or Absence of Occurrence of Delamination when Deep Depth Forming was Performed)

As deep depth forming, deep drawing was carried out on a substantially parallelepiped shape (substantially rectangular parallelepiped shape with one surface open) of 55 mm in length×35 mm in width×5 mm with respect to a packaging material using the above-described deep drawing tool. At this time, forming was carried out so that the heat resistant resin layer 2 became outside of the formed product. Two formed products were prepared for each Example and each Comparative Example. The flanges (sealing peripheral portions: see FIG. 4) 29 of the two formed products 10 were brought into contact with each other and overlapped and heat sealed at 170° C. for 6 seconds. Thereafter, the presence or absence of delamination (peeling) in the heat sealed portion 39 and the presence or absence of appearance floating were checked by visual observation and evaluated based on the following judgment criteria.
(Judgment Criteria)
"○": No delamination (peeling) was observed and no appearance floating was observed (Passed)
"Δ": Although slight delamination (peeling) sometimes occurred, there was virtually no delamination (peeling) and no appearance floating (Passed)
"X": Delamination (peeling) occurred, there was also appearance floating (Failed)
<Hot Water Resistance Evaluation Method>
(Evaluation of Presence or Absence of Occurrence of Delamination when Used Under Severe Environments Such as High Temperature and High Humidity)

Deep drawing was carried out on a substantially rectangular parallelepiped shape (substantially rectangular parallelepiped shape with one face open) of 55 mm in length×35 mm in width×5 mm with respect to a packaging material using the above-described deep drawing tool. At this time, forming was carried out so that the heat resistant resin layer 2 became outside of the formed product. Two formed products were prepared for each Example and each Comparative Example. The flanges (sealing peripheral portion: see FIG. 4) 29 of the two formed products 10 were brought into contact with each other and overlapped and heat sealed at 170° C. for 6 seconds. Next, the heat-sealed article was immersed in hot water at 85° C. for 240 hours, taken out, visually observed the presence or absence of delamination (peeling) in the heat sealed portion 39 and the presence or absence of appearance floating.
(Judgment Criteria)
"○": No delamination (peeling) was observed and no appearance floating was observed (Passed)

"Δ": Although slight delamination (peeling) sometimes occurred, there was virtually no delamination (peeling) and no appearance floating (Passed)
"X": Delamination (peeling) occurred, there was also appearance floating (Failed)
<Lamination Strength Measurement Method at High Temperature>

From the obtained packaging material, a specimen with a width of 15 mm and a length of 150 mm was cut out and peeled off between the aluminum foil and the heat resistant resin layer in the region from the one end in the longitudinal direction to the position inward of 10 mm therefrom.

Using a strograph (AGS-5kNX) manufactured by Shimadzu Corporation in accordance with JIS K6854-3(1999), a laminate containing the aluminum foil was clamped and fixed with one chuck, and the peeled heat resistant resin layer was clamped and fixed with the other chuck and held for 1 minute under a temperature environment of 120° C. Thereafter, the peeling strength when T-peeling was carried out at 120° C. temperature environment at a pulling rate of 100 mm/min was measured, and the value where the measured value stabilized was referred to as "lamination strength (N/15 mm width) at high temperature". The measurement results were evaluated based on the following criteria.
The measurement result was evaluated based on the following criteria.
"○": Lamination strength was equal to or more than "2.0 N/15 mm width" (Passed)
"Δ": Lamination strength was equal to or more than "1.5 N/15 mm width" and less than 2.0 N/15 mm width" (Passed)
"x": Lamination strength was less than "1.5 N/15 mm width" (Passed)

As is apparent from the tables, the packaging materials for a power storage device of Examples 1 to 28 of the present invention was excellent in formability without occurrence of pinholes and/or cracks even if deep depth forming was performed. In addition, even if deep depth forming was performed, it was possible to suppress occurrence of delamination (peeling). Even at high temperatures, the lamination strength was great and hot water resistance was good, and occurrence of delamination (peeling) could be prevented even if it was used under severe environments such as high temperature and high humidity.

On the other hand, in Comparative Examples 1 to 3 which deviated from the range defined by claims of the present invention, at least one of the evaluations was evaluated as "X" (Poor).

INDUSTRIAL APPLICABILITY

As a specific example of the packaging material for a power storage device according to the present invention, the packaging material can be used as a packaging material of various power storage devices, such as, e.g.,
a power storage device, such as, e.g., a lithium secondary battery (a lithium ion battery, a lithium polymer battery, etc.) lithium-ion capacitor, and
Electric double layer capacitor.

Further, the power storage device according to the present invention includes not only the above-exemplified power storage devices but also an all solid state battery.

The present application claims priority to Japanese Patent Application No. 2016-125294 filed on Jun. 24, 2016, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention. The present invention allows any design changes unless departing from its spirit within the scope of the claims.

DESCRIPTION OF REFERENCE SYMBOLS

1: packaging material for a power storage device
2: heat resistant resin layer (outer layer)
3: heat fusible resin layer (inner layer)
4: metal foil layer
5: first adhesive layer (outer adhesive layer)
6: second adhesive layer (inner adhesive layer)
8: easily adhesive layer
10: case (shaped case)
15: packaging member
30: power storage device
31: power storage device main body

The invention claimed is:

1. A packaging material for a power storage device comprising:
a heat resistant resin layer serving as an outer layer wherein the heat resistant resin layer is a biaxially stretched polyamide film;
a heat fusible resin layer serving as an inner layer; and
a metal foil layer disposed between both the layers,
wherein the heat resistant resin layer is a heat resistant resin film with a hot water shrinkage percentage of 1.5% to 12%,
wherein the heat resistant resin layer and the metal foil layer are bonded via an outer adhesive layer, which is a cured film of an ultraviolet light curable resin composition,
wherein the ultraviolet light curable resin composition contains an acrylate resin and a photo-radical polymerization initiator, a silane coupling agent, an acid anhydride having a carbon-carbon double bond, a phosphoric acid-containing (meth) acrylate, one or more resins selected from the group consisting of an epoxy resin, an oxetane resin, and a vinyl ether resin, and a photo-cationic polymerization initiator,
wherein in the ultraviolet light curable resin composition, a content rate of the acrylate resin is 70 mass % to 98 mass %, a content rate of the silane coupling agent is 0.1 mass % to 5 mass %, a content rate of the acid anhydride is 0.1 mass % to 5 mass %, a content rate of phosphoric acid-containing (meth) acrylate is 0.1 mass % to 10 mass %, a content rate of the photo-radical polymerization initiator is 0.1 mass % to 5 mass %, a content rate of one or more resins selected from the group consisting of an epoxy resin, an oxetane resin, and a vinyl ether resin is 1 mass % to 20 mass %, and a content rate of the photo-cationic polymerization initiator is 0.5 mass % to 5 mass %,
wherein a Young's modulus of the cured film is 90 MPa to 400 MPa, and
wherein an adhesive strengthening layer is disposed between the heat resistant resin layer and the outer adhesive layer.

2. A packaging case for a power storage device, wherein the packaging case is made of a formed product of the packaging material as recited in claim 1.

3. A power storage device comprising:
a power storage device main body; and
a packaging member, which is the packaging case as recited in claim 2,
wherein the power storage device main body is packaged with the packaging member.

4. A power storage device comprising:
a power storage device main body; and
a packaging member, which is the packaging material as recited in claim 1,
wherein the power storage device main body is packaged with the packaging member.

5. A packaging material for a power storage device comprising:
a heat resistant resin layer serving as an outer layer;
a heat fusible resin layer serving as an inner layer; and
a metal foil layer disposed between both the layers wherein the metal foil layer is aluminum foil and wherein a chemical conversion coating has been formed on both sides of the aluminum foil,
wherein the heat resistant resin layer is a heat resistant resin film with a hot water shrinkage percentage of 1.5% to 12%,
wherein the heat resistant resin layer and the metal foil layer are bonded via an outer adhesive layer, which is a cured film of an ultraviolet light curable resin composition,
wherein the ultraviolet light curable resin composition contains an acrylate resin and a photo-radical polymerization initiator, a silane coupling agent, an acid anhydride having a carbon-carbon double bond, a phosphoric acid-containing (meth) acrylate, one or more resins selected from the group consisting of an epoxy resin, an oxetane resin, and a vinyl ether resin, and a photo-cationic polymerization initiator,
wherein in the ultraviolet light curable resin composition, a content rate of the acrylate resin is 70 mass % to 98 mass %, a content rate of the silane coupling agent is 0.1 mass % to 5 mass %, a content rate of the acid anhydride is 0.1 mass % to 5 mass %, a content rate of phosphoric acid-containing (meth) acrylate is 0.1 mass % to 10 mass %, a content rate of the photo-radical polymerization initiator is 0.1 mass % to 5 mass %, a content rate of one or more resins selected from the group consisting of an epoxy resin, an oxetane resin, and a vinyl ether resin is 1 mass % to 20 mass %, and a content rate of the photo-cationic polymerization initiator is 0.5 mass % to 5 mass %,
wherein a Young's modulus of the cured film is 90 MPa to 400 MPa, and
wherein an adhesive strengthening layer is disposed between the heat resistant resin layer and the outer adhesive layer.

6. A packaging case for a power storage device, wherein the packaging case is made of a formed product of the packaging material as recited in claim 1.

7. A power storage device comprising:
a power storage device main body; and
a packaging member, which is the packaging case as recited in claim 2,
wherein the power storage device main body is packaged with the packaging member.

8. A power storage device comprising:
a power storage device main body; and
a packaging member, which is the packaging material as recited in claim 1,
wherein the power storage device main body is packaged with the packaging member.

* * * * *